(12) United States Patent
Chen et al.

(10) Patent No.: US 12,487,157 B2
(45) Date of Patent: Dec. 2, 2025

(54) BATTERY BENDING TEST SYSTEM AND METHOD

(71) Applicant: NINGDE AMPEREX TECHNOLOGY LIMITED, Ningde (CN)

(72) Inventors: Yudu Chen, Ningde (CN); Caisheng Liu, Ningde (CN); Ping Li, Ningde (CN); Shi Tan, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 321 days.

(21) Appl. No.: 17/942,056

(22) Filed: Sep. 9, 2022

(65) Prior Publication Data

US 2023/0003808 A1 Jan. 5, 2023

Related U.S. Application Data

(63) Continuation of application No. PCT/CN2020/078646, filed on Mar. 10, 2020.

(51) Int. Cl.
*G01N 3/20* (2006.01)
*G01N 3/02* (2006.01)
(Continued)

(52) U.S. Cl.
CPC .............. *G01N 3/20* (2013.01); *G01N 3/02* (2013.01); *G01N 3/04* (2013.01); *H01M 10/4285* (2013.01); *G01N 2203/0023* (2013.01)

(58) Field of Classification Search
CPC .................................. G01N 3/04; G01N 3/20
See application file for complete search history.

(56) References Cited

U.S. PATENT DOCUMENTS 4,409,843 A * 10/1983 Urban ................... A61J 7/0007
225/103
5,022,273 A * 6/1991 Evans ...................... G01N 3/20
73/849
(Continued)

FOREIGN PATENT DOCUMENTS

CN 103674727 A 3/2014
CN 104865529 A 8/2015
(Continued)

OTHER PUBLICATIONS

Yu et al., Battery Testing System and Battery Test Method, Dec. 2018, FIT Machine Translation (Year: 2018).*
(Continued)

*Primary Examiner* — Erika J. Villaluna
(74) *Attorney, Agent, or Firm* — XSENSUS LLP (57) ABSTRACT

A battery bending test system includes a fastening device having an inclined surface configured to hold a battery; a pressing device configured to press the battery to bend; and a load-bearing device configured to bear the fastening device, the load-bearing device having a reference surface for bearing the fastening device. A first angle Ø is formed between the inclined surface and the reference surface. The range of the first angle Ø is 0°<Ø<90°. The battery bending test system and method can precisely control the bending angle and bending morphology of the battery, and reasonably evaluate the safety performance of the battery when subjected to the bending force, thus meeting expectations of the safety test.

18 Claims, 7 Drawing Sheets

(51) Int. Cl.
*G01N 3/04* (2006.01)
*H01M 10/42* (2006.01)

(56) References Cited

U.S. PATENT DOCUMENTS

| | | | | |
|---|---|---|---|---|
| 5,606,134 | A | * 2/1997 | Stieber | G01N 3/20 |
| | | | | 73/854 |
| 2014/0182392 | A1 | * 7/2014 | Woodhull | B24B 1/00 |
| | | | | 73/851 |

FOREIGN PATENT DOCUMENTS

| CN | 207009568 U | 2/2018 |
|---|---|---|
| CN | 207472695 U | 6/2018 |
| CN | 207521469 U | 6/2018 |
| CN | 109061507 A | 12/2018 |
| CN | 208224320 U | 12/2018 |
| CN | 208721519 U | 4/2019 |
| DE | 3807065 A1 | 9/1989 |
| JP | H04353741 A | 12/1992 |
| JP | 2011209129 A | 10/2011 |
| WO | WO2021/179173 A1 | 9/2021 |

OTHER PUBLICATIONS

Wei, A Soft-Packaged Lithium Battery Clamp for Testing Formation Device, Dec. 2018, FIT Machine Translation (Year: 2018).*
Li et al., Hardness Measuring Device, Apr. 2019, FIT Machine Translation (Year: 2019).*
Ningde Amperex Technology Limited, International Search Report and Written Opinion, PCT/CN2020/078646, Dec. 14, 2020, 14 pgs.
Shenzhen Audio Association, "General technical requirement for the lithium-ion battery and battery pack," ShenZhen Audio Association, SZAA, Jun. 20, 2019, T/SZYX 00001-2019, 17 pgs.

* cited by examiner

BATTERY BENDING TEST SYSTEM AND METHOD

CROSS-REFERENCE TO RELATED APPLICATIONS

This application is a continuation application of PCT Patent Application No. PCT/CN2020/078646, entitled "BATTERY BENDING TEST SYSTEM AND BATTERY BENDING TEST METHOD" filed on Mar. 10, 2020, which is incorporated herein by reference in its entirety.

TECHNICAL FIELD

The embodiments of the present application relate to the field of batteries, and in particular, to a battery bending test system and method.

BACKGROUND

Batteries are extensively used in various electronic products and electric vehicles. However, bending or folding may occur to batteries in practical applications. For example, upon dismantlement and replacement, a battery can only be disconnected with a hard pull as it is firmly attached to the battery compartment. At this time, the battery is subjected to the bending force. In another example, when the device that holds the battery is subjected to the bending force, the battery inside the device is not immune to the bending force. Such bending conditions as described may lead to safety hazards with batteries.

Therefore, there is a need in the industry for a feasible battery bending test system and method to evaluate the possible safety risks caused by battery bending conditions.

SUMMARY

One of the objects of the embodiments of the present application is to provide a battery bending test system and method, which can simulate a reasonable battery bending condition, thereby realizing a reasonable evaluation of the safety performance of the battery when the battery is subjected to a bending force.

A battery bending test system according to one embodiment of the present application, includes: a fastening device having an inclined surface configured to hold the battery; a pressing device configured to press the battery to bend; and a load-bearing device configured to bear the fastening device, the load-bearing device having a reference surface for bearing the fastening device, wherein a first angle Ø is formed between the inclined surface and the reference surface, and the range of first angle Ø is 0°<Ø<90°.

In some embodiments of the present application, the first angle Ø is about 30°, about 45°, or about 60°.

In some embodiments of the present application, the pressing device includes a pressing head, which is configured to press the battery along the direction perpendicular to the reference surface.

In some embodiments of the present application, the fastening device includes a first plate element, and a second plate element parallel to the first plate element for holding part of the battery.

In some embodiments of the present application, the first plate element has the inclined surface and a first lateral surface perpendicular to the inclined surface, and the pressing head has a distance D from the first lateral surface along a direction of the inclined surface extending, when the pressing head is configured to begin to press the battery.

In some embodiments of the present application, the distance D is about 20 mm.

In some embodiments of the present application, the fastening device further includes: a third plate element parallel to the first plate element and a first rod-shaped element penetrating the second plate element and connected to the first plate element and the third plate element, wherein the second plate element is located between the first plate element and the third plate element, and is movable between the first plate element and the third plate element along the first rod-shaped element.

In some embodiments of the present application, the fastening device further includes: a second rod-shaped element penetrating the third plate element having a first end and a second end opposite to the first end; a fourth plate element connected to the first end and to the second plate element; and a third rod-shaped element connected to the second end, the third rod-shaped element being configured to rotate so that the second plate element is driven by the second rod-shaped element to move along the first rod-shaped element.

In some embodiments of the present application, the pressing device is configured to descend at a predetermined speed to contact the battery.

In some embodiments of the present application, the pressing device further includes a connecting element configured to be connected to the pressing head and an actuating element configured to be connected to the connecting element and to control displacement and pressing force of the pressing head.

In some embodiments of the present application, the load-bearing device includes an angular adjustment element configured to be connected to the fastening device and including a bearing surface bearing the fastening device, the bearing surface being parallel to the inclined surface of the fastening device.

In some embodiments of the present application, the angular adjustment element is configured to connect to the reference surface.

In some embodiments of the present application, the load-bearing device includes a base connected to the angular adjustment element.

In some embodiments of the present application, a data acquisition device is further included for collecting battery parameters of the battery to judge the safety performance of the battery.

A battery bending test method according to an alternative embodiment of the present application includes bearing the fastening device by means of a load-bearing device, the load-bearing device having a reference surface bearing the fastening device; holding the battery by means of the fastening device, the fastening device having an inclined surface configured to hold the battery, wherein a first angle Ø is formed between the inclined surface and the reference surface, the range of the first angle Ø being 0°<Ø<90°; pressing the battery to bend by means of a pressing device; and squeezing the battery to a preset condition.

The battery bending test system and method provided by the embodiments of the application can precisely control the bending angle and bending morphology of the battery, reasonably evaluate the safety performance of the battery when the battery is subjected to the bending force, thus meeting expectations of the safety test.

BRIEF DESCRIPTION OF DRAWINGS

The drawings necessary to describe embodiments of the present application or the existing art will be briefly described below to facilitate the description of embodiments of the application. It is apparent that the drawings described below only represent part of embodiments of the present application. It requires no inventive effort for a person skilled in the art to obtain the drawings of other embodiments according to the structures illustrated in the described drawings.

DETAILED DESCRIPTION

Embodiments of the present application will be described in detail below. Identical or similar components and components having identical or similar functions are designated by similar reference numerals throughout the description of the present application. Embodiments described herein with regard to the drawings are illustrative and diagrammatic, and are intended to provide a basic understanding of the present application. Embodiments of the present application should not be interpreted as limitations to the present application.

Relative wordings such as "central," "longitudinal," "lateral," "front," "rear," "right," "left," "internal," "external," "lower," "higher," "horizontal," "vertical," "above," "below," "top," "bottom," and derivatives thereof (such as "horizontally," "downward," and "upward") in the present description, unless specifically specified or defined, should be interpreted as references to directions described in the discussion or depicted in the drawings. These relative wordings are used merely for the convenience of description, and do not require the present application to be constructed or applied in a particular direction.

As used herein, the terms "about," "approximately," "substantially," "substantively," and "similar" are used to describe and illustrate minor variations. When used in conjunction with an event or situation, the terms may refer to instances illustrating precisely or extremely closely how the event or situation occurs. For example, when used in conjunction with values, a term may refer to a range of variation less than or equal to ±10% of the value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if the difference between two values is less than or equal to ±10% of the average of the values (e.g., less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), the two values are considered to be "substantially" the same.

Further, for the convenience of description, "first," "second," "third," and the like may be used herein to distinguish different components of one figure or a series of figures. The terms "first," "second," "third," and the like are not intended to describe corresponding components.

Unless specifically specified or limited, the wordings "provide," "connect," "couple," "fix," and similar thereto are used extensively in the present application, and a person skilled in the art may, depending on the specific circumstances, understand the described wordings as, for example, fixed connection, detachable connection, or integrated connection; it can also be understood as mechanical connection or electrical connection; or as direct connection or indirect connection through an intermediary structure; or as internal communication between two components.

In the detailed description of embodiments and in the claims, a list of items following the terms "a single one of," "one of," "one kind of," or other similar terms may mean any one of the listed items. For example, if items A and B are listed, the phrase "a single one of A and B" means only A or only B. In another example, if items A, B, and C are listed, the phrase "a single one of A, B, and C" means only A; only B; or only C. Item A may include a single element or multiple elements. Item B may include a single element or multiple elements. Item C may include a single element or multiple elements.

In the detailed description of embodiments and in the claims, a list of items following the terms "at least a single one of," "at least one of," "at least one kind of," or other similar terms may mean any combination of the listed items. For example, if items A and B are listed, the phrase "at least a single one of A and B" means only A; only B; or A and B. In another example, if items A, B, and C are listed, the phrase "at least a single one of A, B, and C" means only A; or only B; only C; A and B (excluding C); A and C (excluding B); B and C (excluding A); or all of A, B and C. Item A may include a single element or multiple elements. Item B may include a single element or multiple elements. Item C may include a single element or multiple elements.

The General Technical Requirement of Lithium-ion Cells for Wireless Headset proposes a method of bending batteries, which requires an operating temperature of 20±5 degrees Celsius. The battery may be a cuboid having four edges extending in a length direction and four edges extending in a width direction, wherein a first edge and a second edge extend in the length direction, a third edge and a fourth edge extend in the width direction, and the third edge and the fourth edge are both located between the first edge and the second edge. First, the battery to be tested is fully charged according to manufacturer instructions for battery. Then, the battery is held loosely between two clamps of a testing machine, one of the clamp being movable to bend the battery. Next, the first edge, the second edge, the third edge and the fourth edge of the battery are bent to and fro up to 250 times at a frequency of 0.5 Hz. The battery can be bent using the device at an angle ranging from 45 degrees to 60 degrees.

However, it is not common in the battery exposed to repeated bending of high frequency in practical applications. Therefore, the described test method does not accurately and properly simulate a common condition when the battery is subjected to bending force, and cannot reasonably evaluate the safety performance in practical applications, thus failing to meet expectations of the safety test.

Another method is further provided by the existing art. Two metal blocks are placed horizontally, on which Teflon tapes are applied; the battery is tightly wrapped with Teflon bands followed by being placed between the two metal blocks to ensure that the battery does not slide between the blocks. Then, the battery is pressed vertically downward by using a pressing head.

However, the applicant found that the battery clamped with metal blocks applied with Teflon bands could not be held securely. During the practical testing process, the battery and the metal blocks slide over each other easily, and thus the test cannot run smoothly. Moreover, the contact edges between the metal blocks and the battery are seamed edges that are likely to render the battery bearing a shear force, which does not conform to the practical condition of the battery. In addition, because the battery is pressed downward along a direction perpendicular to the horizontal plane according to the existing test methods, the control over the battery only provides a bending angle of a small range from about 45 degrees to 60 degrees. If a greater range of the bending angle is desired to achieve, such as about 0 degree to 90 degrees, or about 0 degree to 120 degrees, or about 0 degree to 180 degrees, it is difficult to attain with existing test methods or systems. Furthermore, the accurate control over the bending angle and bending morphology of the battery is not achievable with two described methods.

In view of the above, the embodiments of the present application provide a novel battery bending test system and method by which the battery is bendable to a predetermined angle, or subjected to a predetermined pressure, or can achieve a predetermined displacement, so that precise control over the bending angle, displacement of the battery, and pressure exerted thereon are achieved to effectively and reasonably evaluate the safety performance of the battery based on a feasible battery bending test. In addition, by virtue of the system provided by the embodiments of the application, the battery can be firmly held to prevent the battery and the fastening device from sliding over each other during the testing process, and thus the test can be conducted more conveniently and efficiently. Further, by means of the system provided by the embodiments of the present application, the battery can bend at an angle ranging from about 0 degree to 180 degrees instead of being limited to about 45 degrees to 60 degrees.

Figure 1A:
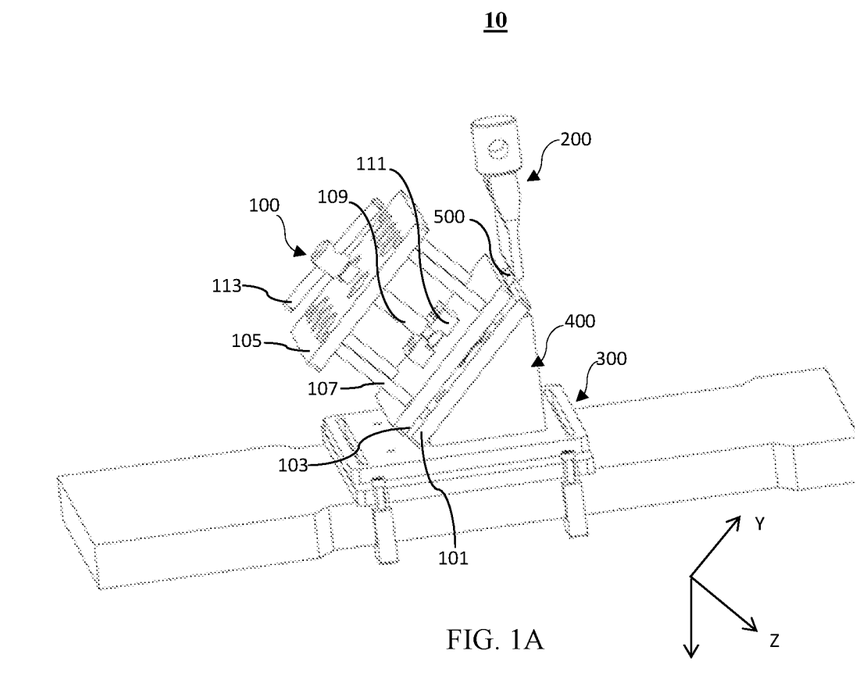
FIG. 1A is a schematic perspective view showing a battery bending test system according to one embodiment of the present application.
Figure 1B:
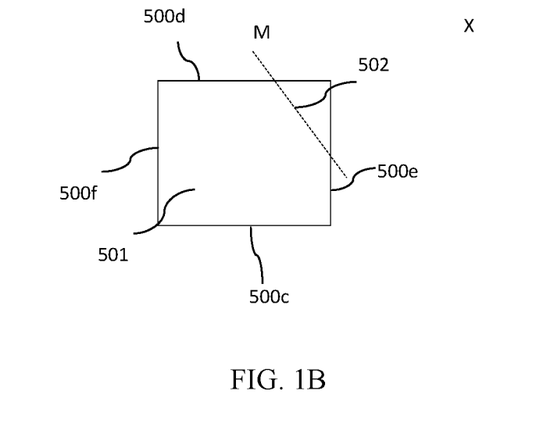
FIG. 1B is a top view showing the battery along a Z direction of the battery bending test system of the embodiment shown in FIG. 1A.
Figure 2:
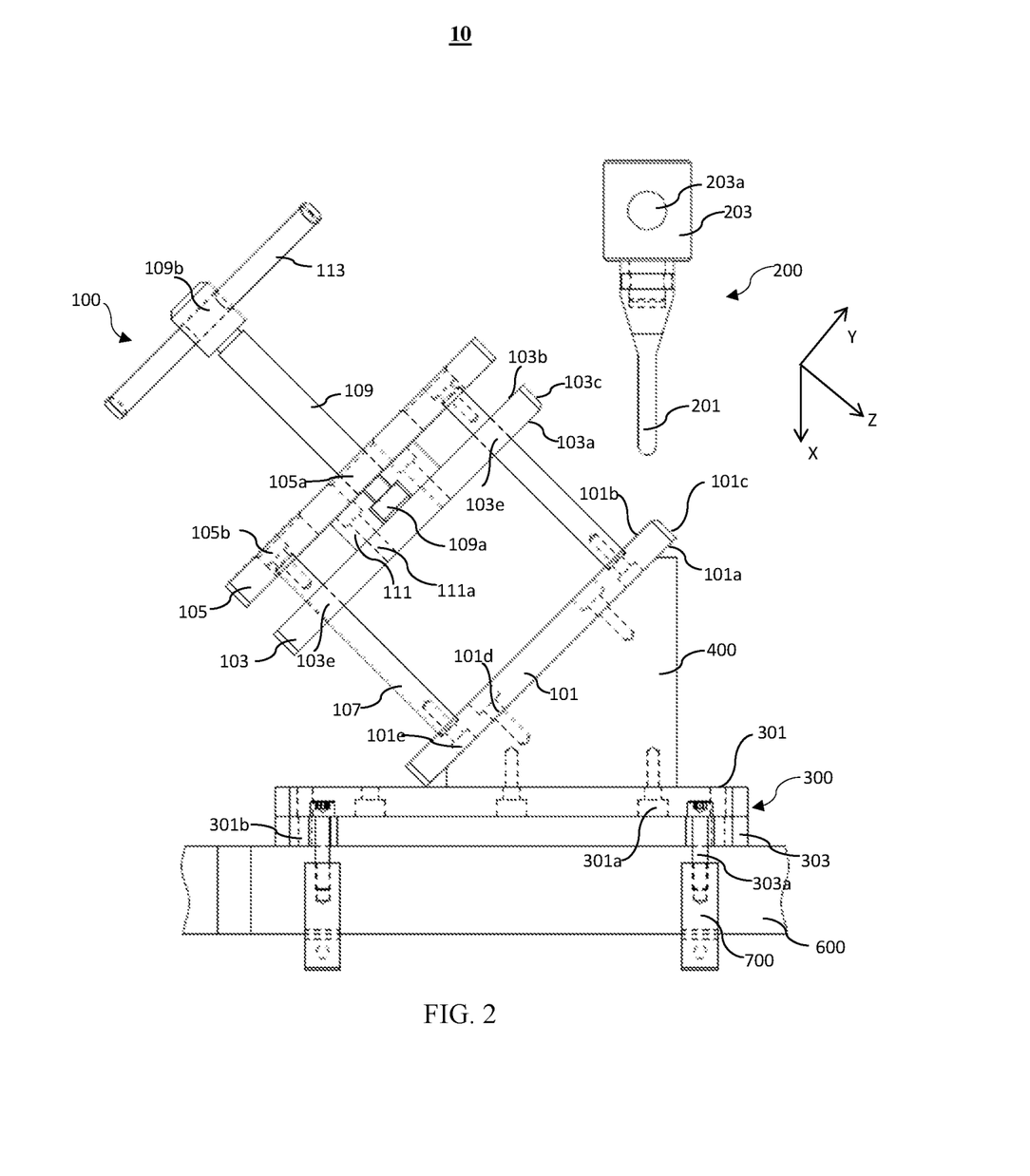
FIG. 2 is a schematic lateral view showing the battery bending test system of the embodiment shown in FIG. 1A, which illustrates a state of the battery bending test system without holding the battery.
Figure 3:
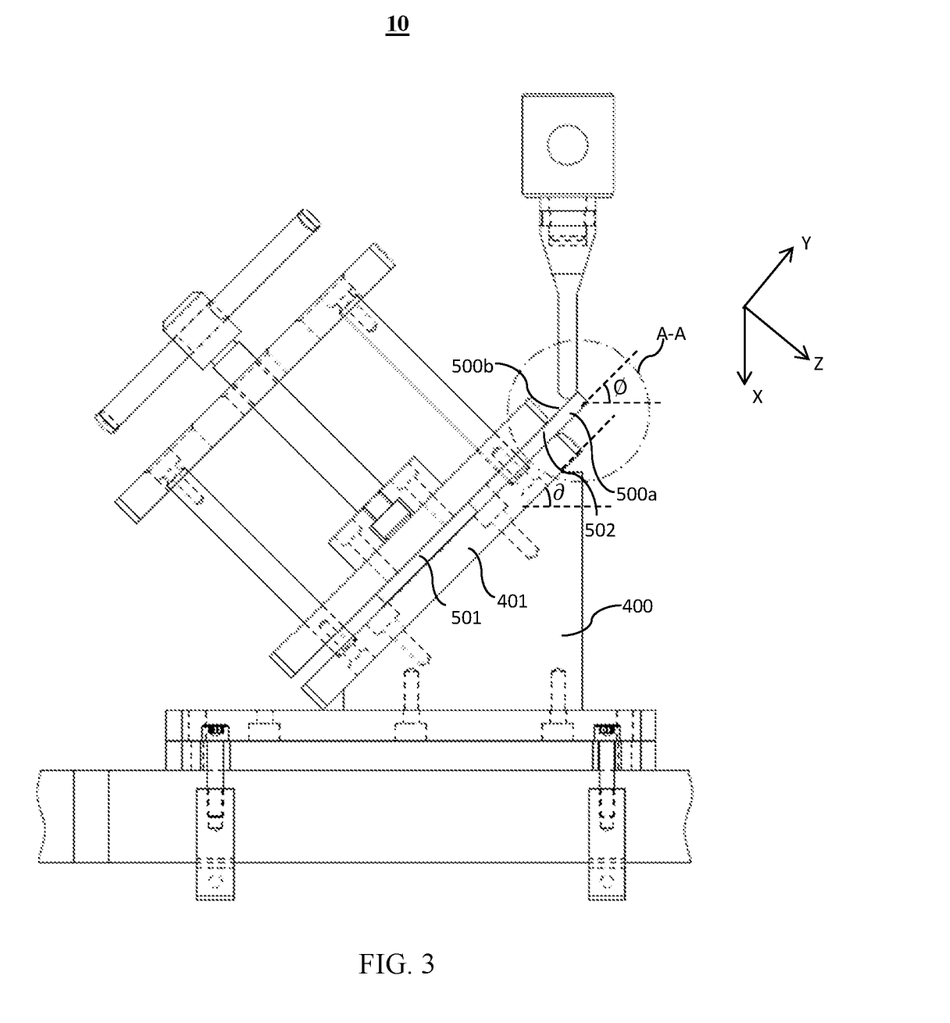
FIG. 3 is a schematic lateral view showing the battery bending test system of the embodiment shown in FIG. 1A, which illustrates a state of the battery bending test system when holding the battery.
Figure 4:
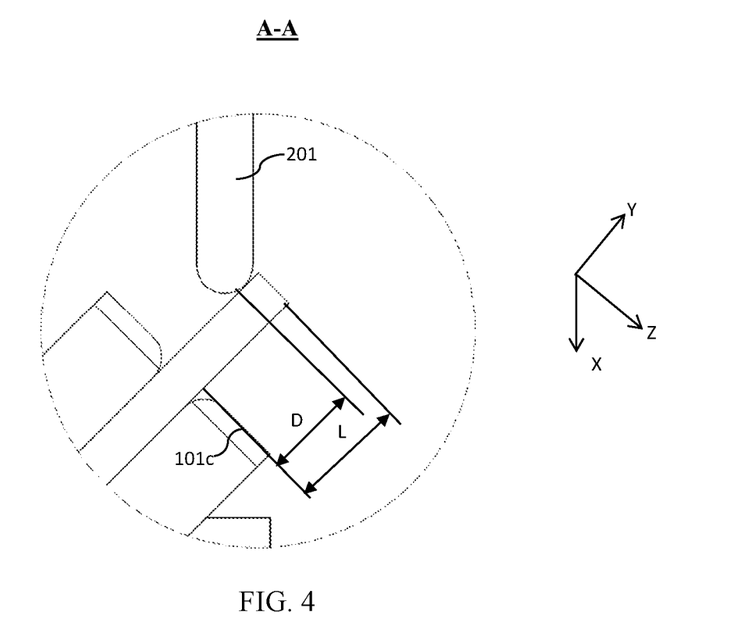
FIG. 4 is a schematic enlargement view of portion A-A of the battery bending test system of the embodiment shown in FIG. 3.
Figure 5:
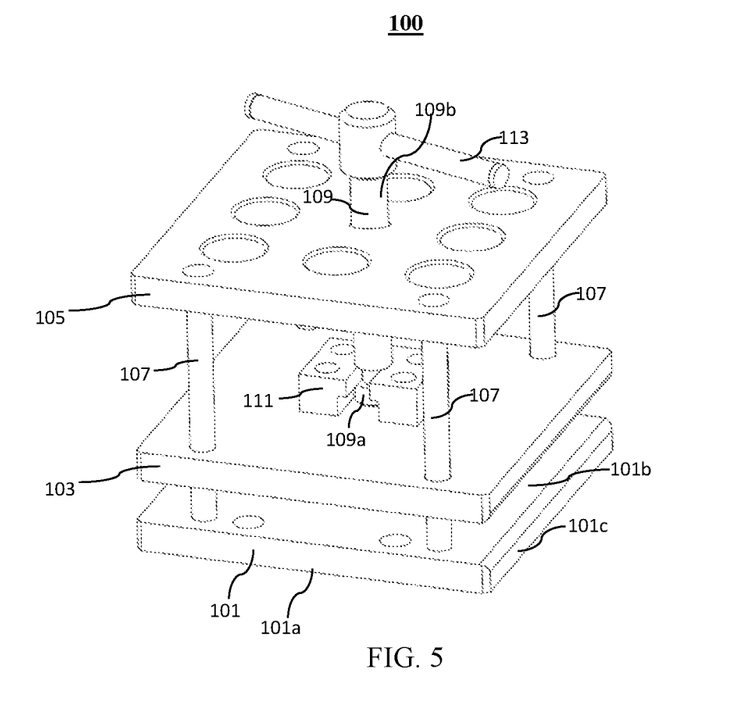
FIG. 5 is a schematic perspective view showing a fastening device of the battery bending test system of the embodiment shown in FIG. 1A.

FIG. 1 is a schematic perspective view showing a battery bending test system 10 according to one embodiment of the present application. FIG. 1B is a top view showing the battery along a Z direction of the battery bending test system 10 of the embodiment shown in FIG. 1A. FIG. 2 is a schematic lateral view showing the battery bending test system 10 of the embodiment shown in FIG. 1A, which illustrates a state of the battery bending test system 10 without holding the battery. FIG. 3 is a schematic lateral view showing the battery bending test system 10 of the embodiment shown in FIG. 1A, which illustrates a state of the battery bending test system 10 when holding the battery. FIG. 4 is a schematic enlargement view of portion A-A of the battery bending test system 10 of the embodiment shown in FIG. 3. FIG. 5 is a schematic perspective view showing the fastening device of the battery bending test system 10 of the embodiment shown in FIG. 1A. As shown in FIGS. 1a to 5, the battery bending test system 10 according to one embodiment of the present application includes a fastening device 100, a pressing device 200, a load-bearing device 300, an angular adjustment element 400 and a battery 500.

In one embodiment, the fastening device 100 may be configured to hold the battery 500. The fastening device 100 may include a first plate element 101, a second plate element 103, a third plate element 105, a first rod-shaped element 107, a second rod-shaped element 109, a fourth plate element 111, and a third rod-shaped element 113. The material of the first plate element 101, the second plate element 103, the third plate element 105, the first rod-shaped member 107, the second rod-shaped element 109, the fourth plate element 111, and the third rod-shaped element 113 may be metallic or nonmetallic material having proper hardness.

In one embodiment, the first plate element 101 may be configured to be mounted on a reference surface 301 of the load-bearing device 300 by means of the angular adjustment element 400. In other embodiments of the present application, the first plate element 101 may be configured to be mounted on the reference surface 301 of the load-bearing device 300 in any suitable manner. The first plate element 101 includes a first surface 101a and a second surface 101b opposite to the first surface 101a, and a first lateral surface 101c perpendicular to and located between the first surface 101a and the second surface 101b. The second surface 101b configured to hold the battery 500 may be referred to in this application as an inclined surface. The first surface 101a of the first plate element 101 is provided on the angular adjustment element 400. The intersection of the second surface 101b and the first lateral surface 101c may be chamfered to prevent the shear force created by said intersection acting upon the battery 500 when the pressing device 200 presses the battery 500. The first plate element 101 may be connected to the angular adjustment element 400 via bolts 101d and to the first rod-shaped element 107 via bolts 101e. In other embodiments of the present application, the first plate element 101 may be configured to be connected to the angular adjustment element 400 and the first rod-shaped element 107 in any suitable manner.

In one embodiment, the battery 500 has a first portion 501 positioned on the second surface 101b of the first plate element 101, and a second portion 502 extending from a plane where the first lateral surface 101c is located as the starting point in a direction the inclined surface extends, i.e. a Y direction. The battery 500 has a first surface 500a and a second surface 500b opposite to the first surface 500a, and both the first portion 501 and the second portion have the first surface 500a and the second surface 500b. The fastening device 100 is configured to hold the first surface 500a and the second surface 500b of the first portion 501, and expose the first surface 500a and the second surface 500b of the second portion 502 of the battery 500 so that the pressing device 200 can press the second portion 502 of the battery 500. Referring to FIG. 1B, the left side of a dashed line M in FIG. 1B is the first portion 501 clamped in the fastening device 100, and the right side of the dashed line M is the second portion 502. When the battery 500 is held between the first plate element 101 and the second plate element 103, the first surface 500a of the battery 500 intersects perpendicularly with the first lateral surface 101c, and the first surface 500a of the battery 500 is parallel to the first surface 101a and the second surface 101b of the first plate element 101. The second portion 502 of the battery 500 passes out of between the first plate element 101 and the second plate element 103 and extends at a first distance L from a plane where the first lateral surface 101c is located as the starting point in a direction the first surface 500a of the battery extends. The first distance L may be, for example, but not limited to, about 10 mm, about 20 mm, about 30 mm, about 35 mm, about 40 mm, or about 50 mm. The value of the first distance L may be determined according to the specific model of the battery 500 or actual situation. The battery 500 may be substantially a cuboid having a first edge 500c and a second edge 500d parallel to the first edge 500c, and a third edge 500e and a fourth edge 500f perpendicularly intersecting the second edge 500d and the first edge 500c in a plane viewed from a Z direction. The Z direction is perpendicular to the first surface 500a of the battery 500. The second portion 502 is a portion of the corner where the point of intersection of the third edge 500e and the second edge 500d is located. In other embodiments of the present application, the second portion 502 may be a portion of the corner where the point of intersection of any two of the first edge 500c, the second edge 500d, the third edge 500e, and the fourth edge 500f is located. In other embodiments of the present application, the battery 500 may be of any shape, and the second portion 502 of the battery 500 may be any portion of the battery 500.

In one embodiment, the second plate element 103 is parallel to the first plate element 101. The second plate element 103 includes a third surface 103a and a fourth surface 103b opposite to the third surface 103a, and a second lateral surface 103c perpendicular to and located between the third surface 103a and the fourth surface 103b. The third surface 103a configured to hold the battery 500 may be referred to as the inclined surface in the present application. The second plate element 103 includes a through hole 103e passing through said second plate element. The through hole 103e may receive the first rod-shaped element 107 such that the second plate element 103 is movable along the first rod-shaped element 107. In other embodiments of the present application, the second plate element 103 may be configured to receive the first rod-shaped element 107 in any suitable manner. The second plate element 103 may be moved along the first rod-shaped element 107 in a direction towards the first plate element 101 so that the first portion 501 of the battery 500 is held between the first plate element 101 and the second plate element 103. Alternatively, the second plate element 103 may be moved in a direction away from the first rod-shaped element 107 so that the first portion 501 of the battery 500 held between the first plate element 101 and the second plate element 103 is disconnected from the fastening device 100. When the battery 500 is held between the first plate element 101 and the second plate element 103, the first surface 500a of the battery 500 intersects perpendicularly with the first lateral surface 103c of the second plate element 103, and is parallel to the third surface 103a and the fourth surface 103b of the second plate element 103. The intersection of the third surface 103a and the second lateral surface 103c of the second plate element may be chamfered to prevent the shear force created by said intersection acting upon the battery 500 when the pressing device 200 presses the battery 500.

In one embodiment, the third plate element 105 is parallel to the first plate element 101 and the second plate element 103. The third plate element 105 includes a through hole 105a passing through said third plate element. The through hole 105a may receive the second rod-shaped element 109 so that the second rod-shaped element 109 can drive the second plate element 103 to move along the first rod-shaped element 107. The third plate element 105 may be connected to the first rod-shaped element 107 via bolts 105b.

In one embodiment, the first rod-shaped element 107 may be configured to penetrate the second plate element 103, which is connected to the first plate element 101 via bolts 101e and to the third plate element 105 via bolts 105b. The first rod-shaped element 107 is fixed between the first plate element 101 and the second plate element 103.

In one embodiment, the second plate element 109 may be configured to penetrate the third plate element 105. The second rod-shaped element 109 has a first end 109a, and a second end 109b opposite to the first end 109a. The first end 109a may be configured to be fixed in the fourth plate element 111. The fourth plate element 111 is connected to the second plate element 103 via bolts 111a, whereby the second rod-shaped element 109 fixed in the fourth plate element 111 can drive the second plate element 103 to move. The second end 109b may be configured to be connected to the third plate element 113.

In one embodiment, the fourth plate element 111 may be configured to receive and fix the first end 109a of the second rod-shaped element 109 and may be connected to the second plate element 103 via bolts 111a. In other embodiments of the present application, the fourth plate element 111 may fix the first end 109a and be connected to the second plate element 103 in any suitable manner. When the second rod-shaped element 109 moves in a direction towards the first plate element 101, the fourth plate element 111 moves with the second rod-shaped element 109 in the direction towards the first plate element 101 whereby to push the second plate element 103 to move in the direction towards the first plate element 101 along with the first rod-shaped element 107. When the second rod-shaped element 109 moves in a direction away from the first plate element 101, the fourth plate element 111 moves with the second rod-shaped element 109 in the direction away from the first plate element 101 whereby to drive the second plate element 103 to move in the direction away from the first plate element 101 along with the first rod-shaped element 107.

In one embodiment, the third rod-shaped element 113 may be configured to be connected to the second end 109b of the second rod-shaped element 109. The third rod-shaped element 113 may be configured to rotate about in a direction that the body of the second rod-shaped element 109 extends, and thereby the second rod-shaped element 109 is movable through the through hole 105a of the third plate element 105, so that the second rod-shaped element 109 can be moved in the direction towards or away from the first plate element 101 to drive the second plate element 103 to move in the direction towards or away from the first plate element 101 along with the first rod-shaped element 107.

In one embodiment, the pressing device 200 may be configured to press the first surface 500a of the second portion 502 of the battery 500 to bend the battery 500. The pressing device 200 includes an actuating element (not shown), a pressing head 201 and a connecting element 203.

In one embodiment, the actuating element (not shown) may be configured to connect to the connecting element 203. The actuating element can control the displacement of the pressing head 201 and the pressing force exerted on the battery 500. The actuating element may be configured to ensure that the pressing head 201 presses the battery 500 to the preset condition. The preset condition may be that a predetermined displacement is achieved by bending the battery 500, or a predetermined pressing force is achieved by pressing the battery 500, or a predetermined voltage drop of the battery 500 is achieved. The predetermined displacement may be, for example, but not limited to, about 17.32 mm. The predetermined displacement may be a displacement of the battery 500 in a first direction X. The first direction X is perpendicular to and towards the reference surface 301. The predetermined pressing force may be, for example, but not limited to, about 100 N. The predetermined voltage drop may be, for example, but not limited to, about 50 my. The predetermined displacement, pressing force and voltage drop can be set according to the model of the battery 500 and actual needs. The actuating element may be configured to enable the pressing head 201 to press the first surface 500a of the second portion 502 of the battery 500 at a speed of about 180 mm/min to 600 mm/min. When the displacement, pressing force or voltage drop of the battery 500 is measured to reach the predetermined value, the actuating element may cause the pressing head 201 to cease from pressing. The actuating element may be configured to ensure the displacement of the pressing head 201 and the pressing force with a tolerance of ±1%. The actuating element may be connected to the connecting element 203 in any suitable manner or directly to the pressing head 201. The actuating element may be configured to press the battery to bend to a predetermined angle, or to subject to a predetermined pressure, or to achieve a predetermined displacement by means of the pressing head 201, so that precise control over the bending angle, displacement of the battery 500, and pressure exerted thereon are achieved to effectively and reasonably evaluate the safety performance of the battery based on a feasible battery bending test.

In one embodiment, the pressing head 201 may be configured to descend at a predetermined speed to contact the first surface 500a of the second portion 502 of the battery 500. The pressing head 201 may be configured to press the first surface 500a of the second portion 502 along the first direction X perpendicular to the reference surface 301 of the load-bearing device 300 to bend the battery 500. In the direction the first surface 500a of the battery 500 extends, i.e., the Y direction shown in FIGS. 3 and 4, at the very beginning the pressing head 201 descends to press the battery 500, there is a second distance D between the position where the pressing head 201 just starts pressing the battery 500 and the first lateral surface 101c to prevent the pressing head 201 from contacting the fastening device 100 during subsequent pressing of the battery 500. The second distance D may be, for example, but not limited to, about 10 mm, about 15 mm, or about 20 mm. When the pressing head 201 presses the battery 500, the pressing head 201 moves on the surface 500b of the battery 500 in a direction towards the first lateral surface 101c. Therefore, a minimum distance D is reserved to provide space for movement of the pressing head 201 to prevent the pressing head 201 from touching the fastening device 100. The value of the minimum distance D may be determined according to the specific model of the battery 500 or actual needs.

In one embodiment, the material of the pressing head 201 may be S136. The material of the pressing head 201 may be any material having a suitable hardness to press the battery 500.

In one embodiment, the connecting element 203 may be configured to connect to the pressing head 201. The connecting element 203 may be a connecting shaft. The material of the connecting element 203 may be S136. The diameter of the connecting element 203 may be, for example, but not limited to, about 30 mm, about 40 mm, or about 50 mm. The material of the connecting element 203 may possess suitable hardness to connect the pressing head 201 with the actuating element. The connecting element 203 may be provided with a pin 203a. The pressing head 201 may be connected to the connecting element 203 by means of the pin 203a. In other embodiments of the present application, the connecting element 203 may be a connecting element of any suitable shape and material.

In one embodiment, the load-bearing device 300 may be configured to bear the fastening device 100. The load-bearing device 300 has the reference surface 301 bearing the angular adjustment element 400. The fastening device 100 is provided on the reference surface 301 of the load-bearing device 300 by means of the angular adjustment element 400 so that a first angle Ø is formed between the first surface 101a and the second surface 101b of the first plate element 101 of the fastening device 100 and the reference surface 301. The first angle Ø may, for example, but not limited to, in a range about 0°<Ø<180°, about 0°<Ø<120° or about 0°<Ø<90°. The first angle Ø may be, for example, but not limited to, about 30°, about 45°, or about 60°.

In one embodiment, the load-bearing device 300 may include a base 301. The angular adjustment element 400 may be connected to the base 301 by screws 301a. The load-bearing device 300 may also include a fixing base 303 configured to be connected to the base 301. The base 301 can be connected to the fixing base 303 by screws 301b. In embodiments of the present application, the base 301 and the fixing base 303 may be connected in any suitable manner.

In one embodiment, the battery bending test system 10 may also include a test platform 600. The test platform 600 may be configured to bear the fixing base 303. The fixed base 303 can be connected to the test platform 600 by means of the screws 303a and fixing elements 700. The fixing elements 700 may be L-shaped, which may securely connect the test platform 600 to the fixing base 303. In other embodiments of the present application, the fixing elements 700 may be of any suitable shape to fix the fixing base 303 to the test platform 600. In embodiments of the present application, the fixing base 303 and the test platform 600 may be connected in any suitable manner.

In one embodiment, the angular adjustment element 400 may be configured to connect to the fastening device 100. The angular adjustment element 400 includes a bearing surface 401 bearing the fastening device 100. The first plate element 101 may be connected to the angular adjustment element 400 via bolts 101d. The first surface 101a of the first plate element 101 is provided on and parallel to the bearing surface 401. Thus, the included angle ∂ between the bearing surface 401 and the reference surface 301 is equal to the first angle Ø between the first surface 101a or the second surface 101b of the first plate element 101 and the reference surface 301. Therefore, the angular adjustment element 400 having different included angles ∂ can be provided to form the first angle Ø of different degrees between the first surface 101a and the second surface 101b of the first plate element 101 and the reference surface 301 of the load-bearing device 300, so that the pressing device 200 can bend the battery 500 at a convenient and suitable angle θ and to any suitable angle ranging, for example, but not limited to about 0°≤θ≤180°, about 0°≤θ≤120°, about 0°≤Ø≤90°, about 0°≤Ø≤60°, or about 0°≤Ø≤45°.

In some embodiments of the present application, the battery bending test system 10 further includes a data acquisition device (not shown). The data acquisition device is used to collect the battery parameters of the battery 500 to judge the safety performance of said battery. The battery parameters include various parameters that may indicate the safety performance of the battery 500, such as, but not limited to, temperature, voltage, displacement, and pressing force to which the battery 500 is subjected. If the battery 500 catches fire or explodes during testing, the temperature of the battery 500 will rise rapidly to a higher temperature and the voltage will drop to about 0 V. If the battery 500 does not catch fire or explode during testing, the temperature and voltage of the battery 500 will not change significantly.

The battery bending test system 10 provided by the embodiments of the present application can firmly hold the battery 500 between the first plate element 101 and the second plate element 103 to prevent the battery 500 from moving during the testing process, and the first plate element 101 and the second plate element 103 do not exert shear force on the battery 500. In addition, the first angle Ø is formed between the second surface 101b of the first plate element 101 of the fastening device 100 holding the battery 500 and the reference surface 301 by providing the angular adjustment element 400, thus, the pressing device 200 can conveniently press the battery 500 to bend at any desired angle θ. The bending angle θ, not being limited to a range of only about 45 degrees to 60 degrees in the existing art, can reach a range of about 0 degree to 180 degrees. Therefore, the battery bending test system 10 provided in the embodiments of the present application can accurately and appropriately simulate the common conditions when the battery is subjected to the bending force, thus meeting expectations of the safety test.

Figure 6:
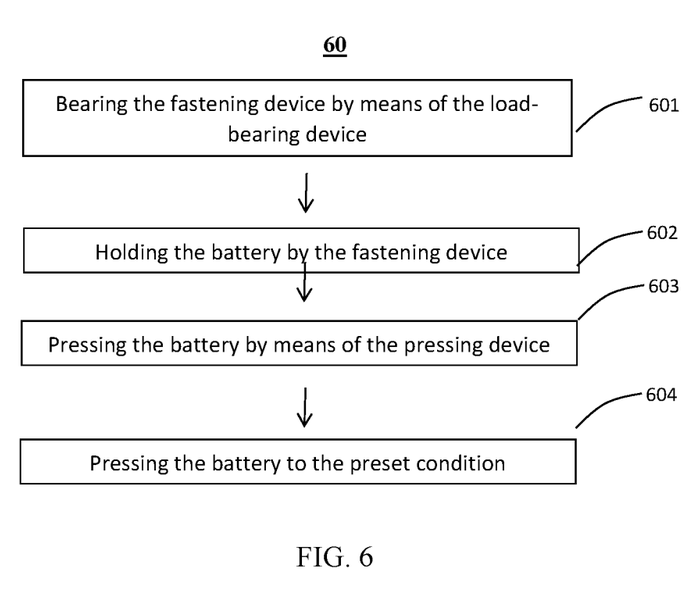
FIG. 6 is a flow chart showing the battery bending test method according to one embodiment of the present application.

FIG. 6 is a flow chart showing a battery bending test method 60 according to one embodiment of the present application using a battery bending test system 100 provided in the embodiments of the present application as shown in FIGS. 1 to 5.

According to the embodiment shown in FIG. 6, in step 601, the battery bending test system 100 is provided to bear the fastening device 100 by means of the load-bearing device 300 having the reference surface 301 bearing the fastening device 100.

Then, in step 602, the battery 500 is held by the fastening device 100 of the battery bending test system 100. Specifically, the battery 500 is placed on the second surface 101b of the first plate element 101. Next, the third rod-shaped element 113 may be rotated to drive the second plate element 103 to move in the direction towards the first plate element 101 along the first rod-shaped element 107 to hold the first portion 501 of the battery 500 between the third surface 103a of the second plate element 103 and the second surface 101b of the first plate element 101, i.e., the battery 500 is held between an inclined surface 101b (the second surface 101b) and an inclined surface 103a (the third surface 103a), and the second portion 502 of the battery 500 passes out of between the first plate element 101 and the second plate element 103 to exceed the first lateral surface 101c of the battery 500 at the first distance L in the direction the first surface 500a of the battery 500 extends. The first distance L may be, for example, but not limited to, about 10 mm, about 20 mm, about 30 mm, about 35 mm, about 40 mm, or about 50 mm. The value of the first distance L may be determined according to the specific model of the battery 500 or actual situation. The first angle Ø is formed between the inclined surface 101b (the second surface 101b) or the inclined surface 103a (the third surface 103a) of the fastening device 100 and the reference surface 301. The range of the first angle Ø is 0°<Ø<90°.

In one embodiment, relevant parameters of the battery 500 are acquired using the data acquisition device. The relevant parameters obtained for battery 500 include, for example, but not limited to, the temperature and voltage of the battery 500, and/or pressing force to which the battery is subjected. In some embodiments of the present application, any suitable parameters related to the battery 500 may also be obtained.

In step 603, the first surface 500a of the second portion 502 of the battery 500 is pressed by means of the pressing head 201 of the pressing device 200 to bend the battery 500. The pressing head 201 can be configured to press the first surface 500a of the second portion 502 in the first direction X perpendicular to the reference surface 301 to bend the battery 500. In one embodiment, the actuating component of the pressing device 200 is configured to lower the pressing head 201 at the predetermined speed to contact the first surface 500a of the second portion 502 of the battery 500. The predetermined speed can range from about 0.1 mm/min to 900 mm/min. The range of predetermined speed can be determined according to actual needs. The pressing head 201 may be configured to descend at a constant predetermined speed. In some embodiments of the present application, the pressing head 201 may be configured to descend at a non-constant predetermined speed. When the pressing head 201 descends to press the battery 500 at the very beginning, the minimum distance D between the position where the pressing head 201 just starts pressing the battery 500 and the first lateral surface 101c may be, for example, but not limited to, about 10 mm.

In step 604, the second portion 502 of the battery 500 is pressed to a preset condition. The preset condition may be that a predetermined displacement is achieved by bending the battery 500, or a predetermined pressing force is achieved by squeezing the battery 500, or a predetermined voltage drop of the battery 500 is achieved. The predetermined displacement may be, for example, but not limited to, about 17.32 mm. The predetermined pressing force may be, for example, but not limited to, about 100 N. The predetermined voltage drop may be, for example, but not limited to, about 50 my. The predetermined displacement, pressing force and voltage drop can be set according to the model of the battery 500 and actual needs. The pressing device 200 may be configured to press the first surface 500a of the second portion 502 at a speed of about 180 mm/min to 600 mm/min. When the displacement, pressing force or voltage drop of the battery 500 is measured to reach the predetermined value, the pressing head 200 is ceased from pressing. If the battery 500 does not catch fire or explode when the preset condition is met, the battery can be determined to be qualified. Otherwise, if the battery 500 catches fire or explodes, the battery is determined to be unqualified.

Subsequently, the third rod-shaped element 113 may be rotated in a reverse direction to drive the second plate element 103 to move in a direction away from the first plate element 101 along the first rod-shaped element 107. Thus, the battery 500 held between the first plate element 101 and the second plate element 103 is disconnected.

Therefore, the battery bending test method 60 provided in the embodiment of the present application can simulate the common bending conditions of the battery 500 during the end-use process, under which the bending test on the battery 500 is carried out. Relative movement between the battery 500 and the fastening device 100 can also be avoided during the testing process, thereby ensuring that the battery bending test is carried out effectively and smoothly. Meanwhile, the arrangement of forming the first angle Ø between the first surface 101a of the first plate element of the fastening device 100 and the reference surface 301 enables the pressing device 200 more conveniently press the battery 500 to any desired angle. Furthermore, different preset conditions can be defined according to the specific models of different batteries 500 and actual requirements to carry out reasonable and more flexible bending test on multiple types of batteries. In addition, the battery bending test method 60 provided in the embodiment of the present application can precisely control the bending angle and bending morphology of the battery, so that the safety performance of different types of batteries when subjected to bending force can be evaluated more reasonably, thus meeting expectations of the safety test.

Figure 7:
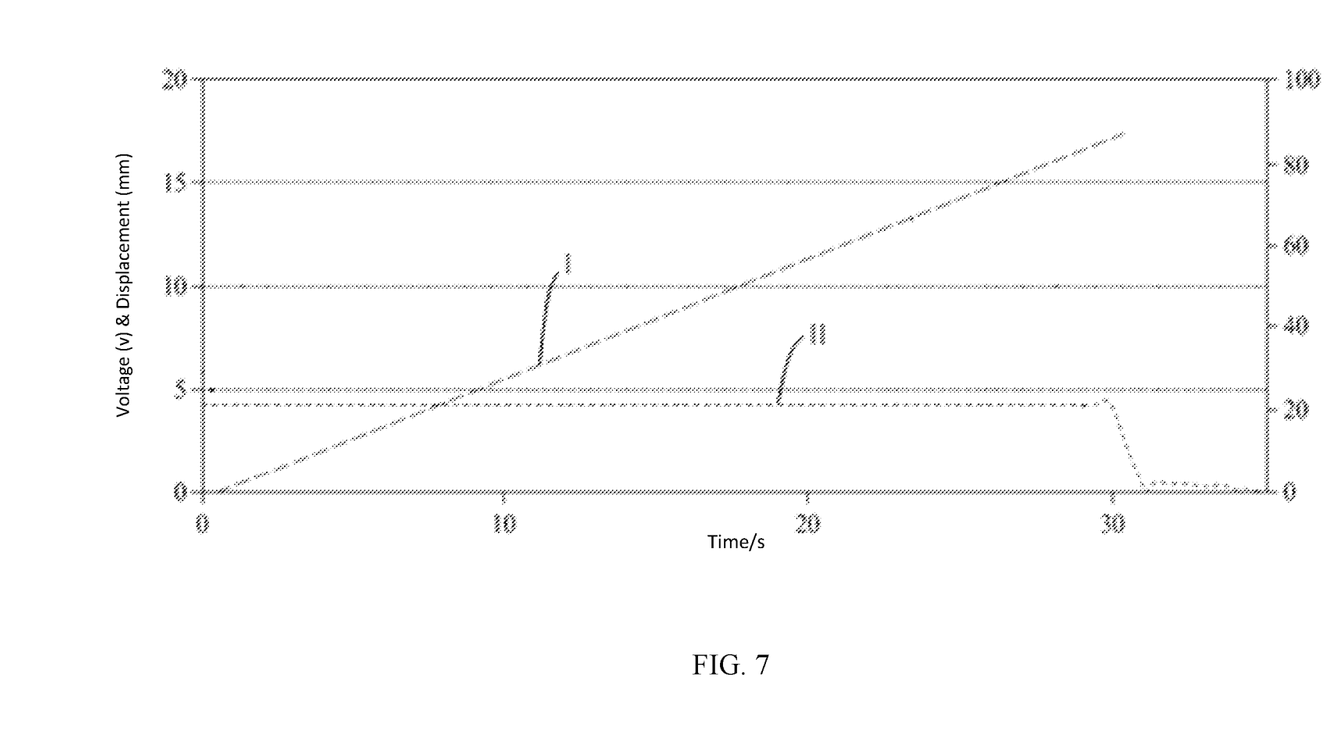
FIG. 7 is a graph showing the variation of parameters of a battery I with time obtained by using the battery bending test method according to one embodiment of the present application.
Figure 8:
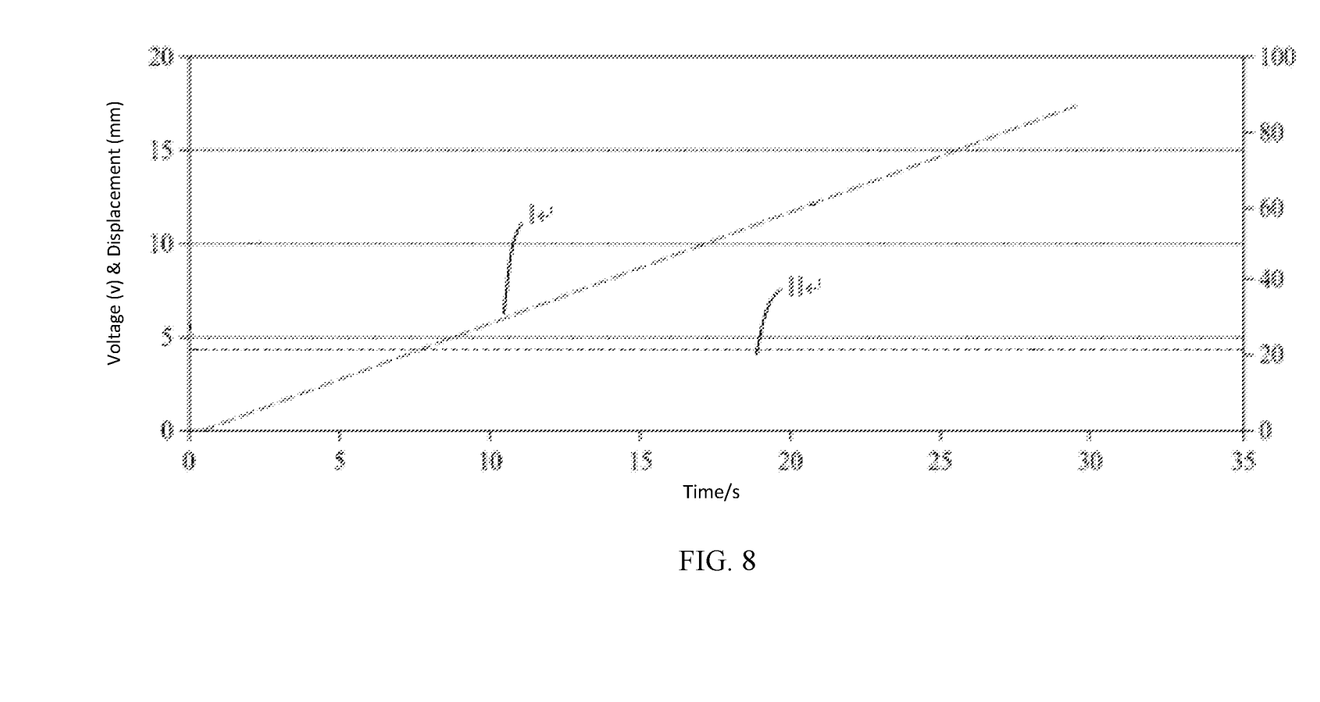
FIG. 8 is a graph showing the variation of parameters of a battery II with time obtained by using the battery bending test method according to one embodiment of the present application.

FIG. 7 is a graph showing the variation of the parameters of a battery I with time obtained by means of the battery bending test method according to one embodiment of the present application. FIG. 8 is a graph showing the variation of the parameters of a battery II with time obtained by means of the battery bending test method according to one embodiment of the present application.

Battery I and battery II of the same model with a width of about 26 mm and a thickness of about 40 mm are provided, and the initial voltage thereof is measured to be about 4.3 v. Battery I and battery II are held in the fastening device 100. Second portions 502 of both battery I and battery II go beyond the first lateral surface 101c of the respective fastening device where battery I and battery II are located at a first distance L of about 20 mm in a direction the first surface 500a of each battery extends, i.e. the Y direction.

The pressing head 201 is brought into contact with the first surfaces 500a of the second portions 502 of battery I and battery II by lowering the pressing device 200 at a predetermined constant speed of about 20 mm/min. When the pressing head 201 descends to press at the very beginning the respective first surface 500a of the second portion 502 of battery I and battery II, the minimum distance D along the Y direction between the position where the pressing head 201 just starts pressing battery I and battery II and the first lateral surface 101c of respective fastening device where each battery is located is about 10 mm.

Subsequently, the pressing head 201 presses battery I and battery II to a predetermined displacement of about 17.5 mm at a speed of 6 mm/min.

The displacement and voltage of battery I and battery II during the testing process are collected with the data acquisition device.

In FIG. 7, the curve of the displacement of battery I changing over time is designated as curve I, and the curve of the voltage of battery I changing over time is designated as curve II. As can be seen from FIG. 7, when the displacement of battery I reaches to about 17.5 mm, the initial voltage of battery I drops rapidly from about 4.3 V to about 0 V. At this time, battery I has caught fire, so it is determined that battery I is unqualified and defective.

In FIG. 8, the curve of the displacement of battery II changing over time is designated as curve I, and the curve of the voltage of battery II changing over time is designated as curve II. As can be seen from FIG. 8, when the displacement of battery II reaches to about 17.5 mm, the initial voltage of battery II is substantially unchanged. Therefore, it can be determined that the battery II is qualified and normal.

In comparison to the battery bending test method proposed in the General Technical Requirement of Lithium-ion Cells for Wireless Headset, the battery test method provided by the present application can set the test conditions to be accorded with the actual conditions according to the characteristics of the battery itself to carry out reasonable bending test on the battery. With a precise control over the bending angle and bending morphology of the battery, said method provided by the application realizes a more reasonable identification of internal defects and risks of the battery, thus meeting the expectations of safety testing, and having a wide range of applications.

The technical contents and features of the present application have been disclosed above, and those skilled in the art may still make various substitutions and modifications on the basis of the teachings and disclosures of the present application without departing from the spirit of the present application. Accordingly, the scope of protection of the present application is not limited to the contents disclosed in the embodiments, and should include various substitutions and modifications covered by the claims of the present application without departing from the present application.

What is claimed is:

1. A battery bending test system, comprising:
   a fastener having a first inclined surface and a second inclined surface parallel to each other, the first inclined surface and the second inclined surface are configured to hold the battery;
   a press to press the battery to bend; and
   a load-bearing structure to bear the fastener, the load-bearing structure having a reference surface bearing the fastener, wherein a first angle Ø is formed between the first inclined surface and the reference surface, a range of the first angle Ø being 0°<Ø<90°,
   wherein the fastener comprises a first plate element and a second plate element parallel to the first plate element for holding a part of the battery,
   the first plate element comprises the first inclined surface and a first lateral surface perpendicular to the first inclined surface,
   the second plate element comprises the second inclined surface and a second lateral surface perpendicular to the second inclined surface,
   the first lateral surface and the second lateral surface are on a same plane,
   the press is configured to descend straightly at a predetermined speed along a direction perpendicular to the reference surface of the load-bearing structure, and
   the load-bearing structure further comprises an angular adjuster, the angular adjuster is a stationary block between the reference surface and the first inclined surface, and the angular adjuster is configured to adjust the first angle Ø within the range of 0°<Ø<90°,
   wherein the fastener further comprises:
   a third plate element parallel to the first plate element, the second plate element being located between the first plate element and the third plate element; and
   a first rod-shaped element penetrating the second plate element and connected to the first plate element and the third plate element; wherein the second plate element is movable between the first plate element and the third plate element along the first rod-shaped element.

2. The battery bending test system according to claim 1, wherein the first angle Ø is 30°, 45° or 60°.

3. The battery bending test system according to claim 1, wherein the press comprises a pressing head configured to press the battery along the direction perpendicular to the reference surface.

4. The battery bending test system according to claim 3, wherein the pressing head has a distance D from the first lateral surface in a first direction, wherein the first direction is a direction in which the first inclined surface extends when the pressing head presses the battery.

5. The battery bending test system according to claim 4, wherein the distance D is 20 mm.

6. The battery bending test system according to claim 1, wherein the fastener further comprises:
a second rod-shaped element penetrating the third plate element, the second rod-shaped element having a first end and a second end opposite to the first end;
a fourth plate element connected to the first end and to the second plate element; and
a third rod-shaped element connected to the second end, the third rod-shaped element being configured to rotate so that the second plate element is driven by the second rod-shaped element to move along the first rod-shaped element.

7. The battery bending test system according to claim 1, wherein the angular adjuster is connected to the fastener, and comprising a bearing surface parallel to the first inclined surface of the fastener to bear the fastener.

8. The battery bending test system according to claim 1, further comprising a data acquisition structure for collecting battery parameters of the battery to judge the safety performance of the battery.

9. A battery bending test method, comprising:
bearing a fastener by means of a load-bearing structure, the load-bearing structure having a reference surface bearing the fastener;
holding the battery by means of the fastener having a first inclined surface and a second inclined surface parallel to each other, both of which configured to hold the battery; wherein a first angle Ø is formed between the first inclined surface and the reference surface, a range of the first angle Ø being 0°<Ø<90°;
pressing the battery to bend by means of a press descending straightly at a predetermined speed along a direction perpendicular to the reference surface of the load-bearing structure; and
pressing the battery to a preset condition,
wherein the fastener comprises a first plate element and a second plate element parallel to the first plate element for holding a part of the battery,
the first plate element comprises the first inclined surface and a first lateral surface perpendicular to the first inclined surface,
the second plate element comprises the second inclined surface and a second lateral surface perpendicular to the second inclined surface,
the first lateral surface and the second lateral surface are on a same plane, and
the load-bearing structure further comprises an angular adjuster, the angular adjuster is a stationary block between the reference surface and the first inclined surface, and the angular adjuster is configured to adjust the first angle Ø within the range of 0°<Ø<90°,
wherein the fastener further comprises:
a third plate element parallel to the first plate element, the second plate element being located between the first plate element and the third plate element; and
a first rod-shaped element penetrating the second plate element and connected to the first plate element and the third plate element; wherein the second plate element is movable between the first plate element and the third plate element along the first rod-shaped element.

10. The battery bending test method according to claim 9, wherein the preset condition is to bend the battery to a predetermined displacement, or the preset condition is to bend the battery to a predetermined pressing force, or the preset condition is to bend the battery to a predetermined voltage drop.

11. The battery bending test method according to claim 10, wherein the predetermined displacement is 17.32 mm, the predetermined pressing force is 100 N, or the predetermined voltage drop is 50 mv.

12. The battery bending test method according to claim 9, wherein the first angle Ø is 30°, 45° or 60°.

13. The battery bending test method according to claim 9, wherein the predetermined speed ranges from 0.1 mm/min to 900 mm/min.

14. The battery bending test method according to claim 9, wherein the press presses the battery at a speed of 180 mm/min to 600 mm/min.

15. The battery bending test method according to claim 9, wherein said holding the battery by means of the fastener comprises: holding a first portion of the battery between the first plate element and the second plate element of the fastener.

16. The battery bending test method according to claim 15, wherein said holding the battery by means of the fastener further comprises: a second portion of the battery passing out between the first plate element and the second plate element, and extending at a first distance from a plane where the first lateral surface is located as a starting point in a direction the first inclined surface extends.

17. The battery bending test method according to claim 16, said pressing the battery along the direction perpendicular to the reference surface by means of the press comprising: when a pressing head initiates pressing the battery, the pressing head having a distance D from the first lateral surface in a direction in which the first inclined surface extends to prevent the pressing head from contacting the fastener during the subsequent pressing.

18. The battery bending test method according to claim 9, further comprising collecting battery parameters of the battery by means of a data acquisition structure, the battery parameters comprising displacement and voltage of the battery, and the pressing force to which the battery is subjected.

* * * * *